(12) United States Patent
Rider et al.

(10) Patent No.: US 9,405,324 B2
(45) Date of Patent: Aug. 2, 2016

(54) ELECTRONIC DEVICE WITH IMPROVED POWER MANAGEMENT AND USER EXPERIENCE

(71) Applicant: Intel Corporation, Santa Clara, CA (US)

(72) Inventors: Tomer Rider, Naahryia (IL); Aviv Ron, Nir Moshe (IL); Yevgeniy Kiveisha, Bney Aish (IL); Yair Giwnewer, Haifa (IL)

(73) Assignee: Intel Corporation, Santa Clara, CA (US)

( * ) Notice: Subject to any disclaimer, the term of this patent is extended or adjusted under 35 U.S.C. 154(b) by 112 days.

(21) Appl. No.: 14/229,843

(22) Filed: Mar. 29, 2014

(65) Prior Publication Data

US 2015/0279264 A1    Oct. 1, 2015

(51) Int. Cl.
*G06F 1/18* (2006.01)
*G06F 1/16* (2006.01)
*G09G 5/36* (2006.01)

(52) U.S. Cl.
CPC ............. *G06F 1/1677* (2013.01); *G09G 5/36* (2013.01); *G09G 2310/04* (2013.01); *G09G 2320/08* (2013.01); *G09G 2330/022* (2013.01); *G09G 2330/023* (2013.01)

(58) Field of Classification Search
CPC ......... G06F 3/01; G06F 3/044; G06F 1/1677; G09G 5/36
See application file for complete search history.

(56) References Cited

U.S. PATENT DOCUMENTS

2013/0328825 A1* 12/2013 Brown ................... G06F 3/01
345/174

* cited by examiner

*Primary Examiner* — Dwayne Bost
*Assistant Examiner* — Sepehr Azari
(74) *Attorney, Agent, or Firm* — Patent Capital Group

(57) ABSTRACT

Particular embodiments described herein provide for an electronic device, such as a notebook computer, laptop, or tablet that includes a circuit board coupled to a plurality of electronic components (which may include any type of components, elements, circuitry, etc.). One particular example implementation of an electronic device may include a display portion partitioned into a plurality of display regions, and a plurality of sensors. Each of the plurality of sensors is associated with a particular display region of the plurality of display regions and is configured to determine whether a portion of an electronic device cover is within proximity to the sensor. The electronic device further includes logic to determine a display state of the particular display region associated with the sensor based upon whether the portion of the electronic device cover is determined to be within proximity of the sensor.

21 Claims, 8 Drawing Sheets

ELECTRONIC DEVICE WITH IMPROVED POWER MANAGEMENT AND USER EXPERIENCE

TECHNICAL FIELD

Embodiments described herein generally relate to an electronic device with improved power management and user experience.

BACKGROUND

End users have more electronic device choices than ever before. Hundreds of portable computing device designs such as laptops, tablets and smartphones are released every year. While the market continues to expand, current problems still exist with these technologies such as excessive power consumption and a sub-par user experience. A major problem with the portable device market today is a lack of a proper solution for power consumption, in particular display screen function, and the lack of acceptable user experience when the electronic device is operating in a reduced power consumption state.

BRIEF DESCRIPTION OF THE DRAWINGS

Embodiments are illustrated by way of example and not by way of limitation in the FIGS. of the accompanying drawings, in which like references indicate similar elements and in which.

Figure 1:
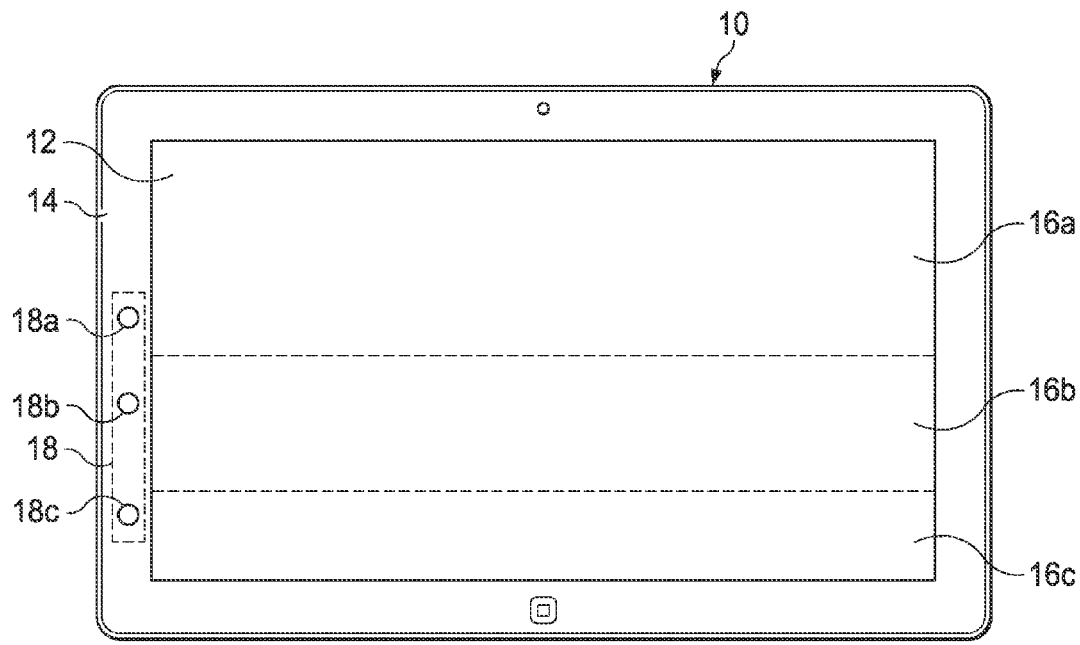
FIG. 1 is a simplified front view illustrating an embodiment of an electronic device in accordance with one embodiment of the present disclosure.

The FIGURES of the drawings are not necessarily drawn to scale, as their dimensions can be varied considerably without departing from the scope of the present disclosure.

DETAILED DESCRIPTION OF EXAMPLE EMBODIMENTS

Overview

Particular embodiments described herein provide for an electronic device, such as a notebook computer, laptop, or tablet that includes a circuit board coupled to a plurality of electronic components (which may include any type of components, elements, circuitry, etc.). One particular example implementation of an apparatus includes logic, at least partially implemented in hardware, to determine a display state of a first partitioned region of a display, based at least in part on a proximity of a display cover to the first partitioned region.

In certain embodiments, the logic is configured to determine a display state of a second partitioned region of the display separately from the first partitioned region. In certain other embodiments, determining the display state of the first partitioned region includes displaying predetermined content within the first partitioned region when the display cover is determined to not be within proximity of the first partitioned region.

In certain embodiments, the logic is configured to allow a user to configure the predetermined content. In certain other embodiments, determining the display state of the first partitioned region includes placing the first partitioned region in an active state when the display cover is determined to be within proximity of the first partitioned region. In certain embodiments, determining the display state of the first partitioned region includes placing the first partitioned region in a power saving state when the display cover is determined to be within proximity of the first partitioned region.

In certain embodiments, the display cover includes a plurality of foldable surfaces. In certain embodiments, the apparatus further includes a plurality of sensors, each of the plurality of sensors being associated with a particular partitioned region of the display and configured to determine whether a portion of the display cover is within proximity to the sensor, and wherein the logic is configured to determine the display state of the particular partitioned region associated with the sensor based upon whether the portion of the display cover is determined to be within proximity of the sensor.

In certain embodiments, the plurality of sensors includes a first array of sensors disposed vertically along a portion of the display. In certain other embodiments, the plurality of sensors includes a second array of sensors disposed horizontally along a portion of the display. In still other certain embodiments, the plurality of sensors includes a first array of sensors disposed vertically along a portion of the display, and a second array of sensors disposed horizontally along a portion of the display.

One particular example implementation of a system includes a display portion of an electronic device, the display portion being partitioned into a plurality of display regions, and a plurality of sensors. Each of the plurality of sensors is associated with a particular display region of the plurality of display regions and configured to determine whether a portion of an electronic device cover is within proximity to the sensor. The system further includes logic to determine a display state of the particular display region associated with the sensor based upon whether the portion of the electronic device cover is determined to be within proximity of the sensor.

One particular example implementation of at least one computer readable storage medium includes instructions, wherein the instructions when executed by at least one processor cause the at least one processor to determine a display state of a first partitioned region of a display, based at least in part on a proximity of a display cover to the first partitioned region.

Example Embodiments

The following detailed description sets forth example embodiments of apparatuses, methods, and systems relating to detachable unit configurations for an electronic device. Features such as structure(s), function(s), and/or characteristic(s), for example, are described with reference to one embodiment as a matter of convenience; various embodiments may be implemented with any suitable one or more of the described features.

FIG. 1 is a simplified front view illustrating an embodiment of an electronic device 10 in accordance with one embodiment of the present disclosure. Electronic device 10 may include a display portion 12 and a bezel portion 14 extending around at least a portion of display portion 12. Display portion 12 may be vertically partitioned into one or more display regions 16a-16c. In the particular embodiment illustrated in FIG. 1, an upper portion of display portion 12 includes a first display region 16a sized to be approximately one-half of the size of display portion 12. Display portion 12 further includes a second display region 16b below first display region 16a and sized to be approximately one-quarter of the size of display portion 12, and a third display region 16c below second display region 16b and sized to be approximately one-quarter of the size of display portion 12. In particular embodiments, electronic device 10 may be configured to independently control a power state of each of first display region 16a, second display region 16b, and third display region 16c as will be further described herein. For example, electronic device 10 may be configured to control a display state of each of display region 16a, second display region 16b, and third display region 16c to be placed in either an active state in which predetermined content is displayed or one or more power saving states.

Electronic device 10 may further include a first sensor array 18 disposed vertically along a portion of bezel portion 14. First sensor array 18 includes one or more sensors 18a-18c configured to detect placement of at least a portion of an electronic device cover (such as foldable electronic device cover 20 further described with respect to FIG. 2) over one or more of display regions 16a-16c of electronic device 10. In particular embodiments, each of sensors 18a-18c are associated with a particular display region 16a-16c. In the particular embodiment illustrated in FIG. 1, first sensor array 18 includes a first sensor 18a is associated with first display region 16a and configured to detect placement of an electronic device cover over first display region 16a, a second sensor 18b is associated with second display region 16b and configured to detect placement of an electronic device cover over second display region 16b, and a third sensor 18c is associated with third display region 16c and configured to detect placement of an electronic device cover over third display region 16c. In still other embodiments, each display region 16a-16c may have a plurality of sensors associated therewith. In particular embodiments, first sensor 18a, second sensor 18b, and third sensor 18c may include one or more of a magnetic sensor, light sensor, conductor or any other sensor/device suitable for detecting proximity of, or covering by, a portion of an electronic device cover.

In one or more embodiments, electronic device 10 is a tablet computer and/or table device. In still other embodiments, electronic device 10 may be any suitable electronic device having a display such as a mobile device, a personal digital assistant (PDA), a smartphone, an audio system, a movie player of any type, a notebook computer or laptop computer, etc. In various embodiments, display portion 12 can be a liquid crystal display (LCD), organic light-emitting diode (OLED), or some other type of display. In particular embodiments, display portion 12 may also be a touchscreen display. In at least one embodiment, electronic device 10 may contain a camera, a microphone, speakers, one or more buttons or any other input/output device.

Figure 2:
FIG. 2 is a simplified front view illustrating an embodiment of a foldable electronic device cover in accordance with one embodiment of the present disclosure.

FIG. 2 is a simplified front view illustrating an embodiment of a foldable electronic device cover 20 in accordance with one embodiment of the present disclosure. Foldable electronic device cover 20 includes a number of foldable surfaces 22a-22d separated by folding axes 24a-24c. In particular, first foldable surface 22a and second foldable surface 22b are separated by a first folding axis 24a, second foldable surface 22b and third foldable surface 22c are separated by a second folding axis 24b, and third foldable surface 22c and fourth foldable surface 22d are separated by a third folding axis 24c. In a particular embodiment, the thickness of material comprising folding axes 24a-24c may be thinner than the thickness of material of foldable surfaces 22a-22d to facilitate folding of folding surfaces 22a-22d along the respective folding axes 24a-24c. In particular embodiments, first foldable surface 22a and second foldable surface 22b are sized to substantially cover first display region 16a when first foldable surface 22a and second foldable surface 22b are placed upon first display region 16a. Third foldable surface 22c is sized to substantially cover second display region 16b when third foldable surface 22c is placed upon second display region 16b, and fourth foldable surface 22d is sized to substantially cover third display region 16c when fourth foldable surface 22d is placed upon third display region 16c.

In one or more embodiments, electronic device 10 may be configured to trigger the display of predetermined content within one or more of display regions 16a-16c when the particular display region 16a-16c is determined to not be covered by foldable electronic device cover 20. In at least one embodiment, electronic device 10 includes software and/or hardware configured to allow a user to configure the predetermine content that is to be displayed within one or more of display regions 16a-16c when the particular display region is determined to not be covered by foldable electronic device cover 20. In various embodiments, one or more of display regions 16a-16c which are covered by foldable electronic device cover 20 are placed in a reduced power state such as dimmed or inactive. In particular embodiments, electronic device 20 may be configured to place one or more of display regions 16a-16c in a reduced power state when a predetermined time delay has elapsed since detection of foldable electronic device cover 20 by one or more associated sensors 18a-18c.

For purposes of illustrating certain example features of electronic device 10, the following foundational information may be viewed as a basis from which the present disclosure may be properly explained. End users have more electronic device choices than ever before. Hundreds of portable computing device designs such as laptops, tablets and smartphones are released every year. While the market continues to expand, current problems still exist with these technologies such as excessive power consumption and a sub-par user experience. A major problem with the portable device market today is a lack of a proper solution for power consumption, in particular display screen function, and the lack of acceptable user experience when the electronic device is operating in a reduced power consumption state.

In various embodiments, an electronic device is provided which includes an array of sensors configured to detect placement of an electronic device cover made up of foldable surfaces (for example, 2-4 foldable surfaces), and control the power state of one or more display regions of a display screen of an electronic device. In various embodiments, a user can expose one or more portions of the display screen, and the electronic device may automatically turn the exposed portions of the display screen on. The exposed portions of the display screen may be configured to provide a specific user experience by displaying predetermined content such as preset widgets, tiles or other information that the user has preset for those particular portions of the screen when exposed by removal of the electronic device cover. According, multiple electronic device display screen coverage states may be configured with a specific user experience and power saving state.

Figure 3A:
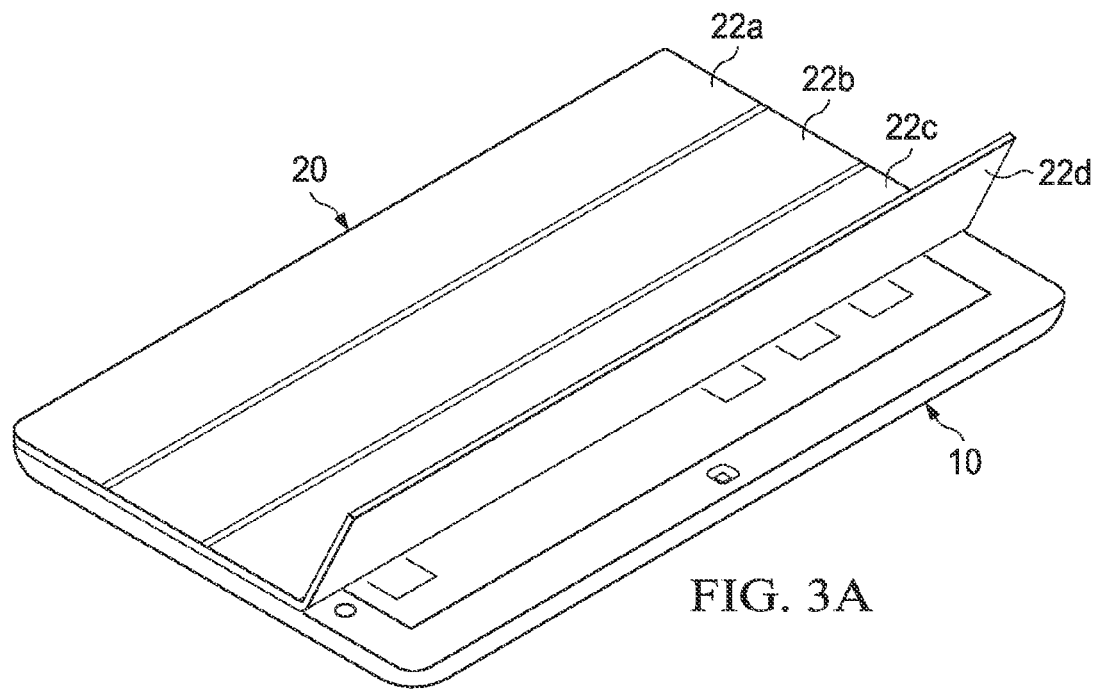
FIGS. 3A-3B are simplified perspective views of an example operation of removal of the foldable electronic device cover from the electronic device according to one embodiment.
Figure 3B:
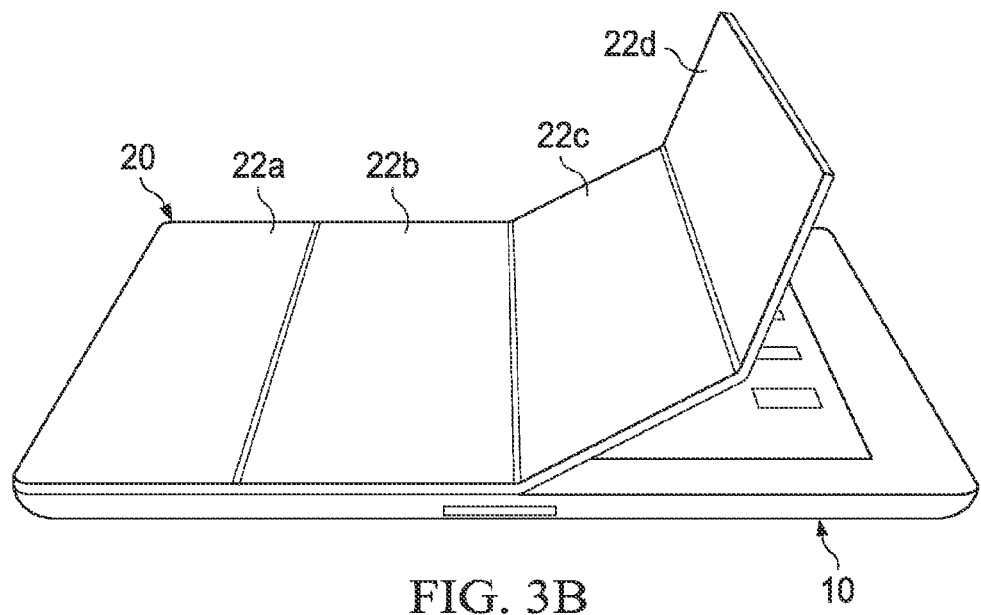

FIGS. 3A-3B are simplified perspective views of an example operation of removal of foldable electronic device cover 20 from electronic device 10 according to one embodiment. FIG. 3A illustrates a configuration of foldable electronic device cover 20 in which fourth foldable surface 22d has been removed from third display region 16c and first foldable surface 22a, second foldable surface 22b, and third foldable surface 22c are covering display regions 16a-16b. FIG. 3B illustrates a configuration of foldable electronic device cover 20 in which third foldable surface 22c has been removed from second display region 16b, fourth foldable surface 22d has been removed from third display region 16c and first foldable surface 22a and second foldable surface 22b are covering first display regions 16a.

Figure 4:
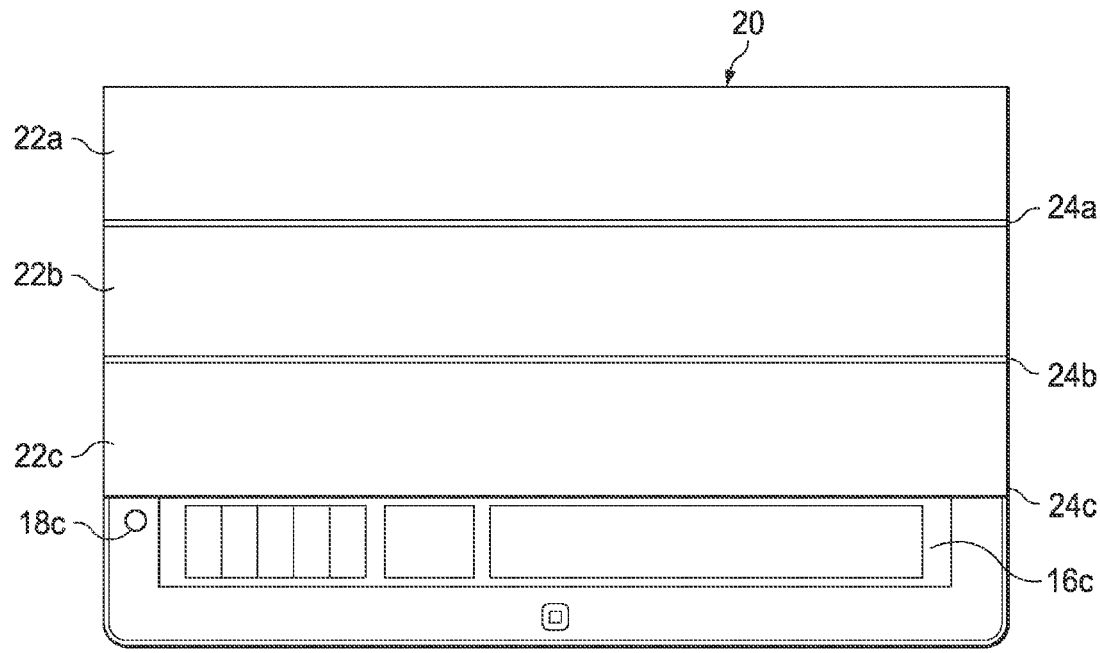
FIG. 4 illustrates an example operation of electronic device according to one embodiment.

FIG. 4 illustrates an example operation of electronic device 10 according to one embodiment. In the embodiment illustrated in FIG. 4, first foldable surface 22a, second foldable surface 22b, and third foldable surface 22c of foldable electronic device cover 20 are covering first display region 16a and second display region 16b of display portion 12. Third display region 16c of display portion is uncovered and is configured to display first predetermined content within third display region 16c. In a particular embodiment, fourth foldable surface 22d has been folded along folding axis 24c to uncover third display region 16c. In the embodiment illustrated in FIG. 4, the first predetermined content displayed in third display region 16c includes a weekly weather forecast, a received e-mail indication, and a current date. In still other embodiments, a user may configure electronic device 10 to display other predetermined content within third display region 16c when third display region 16c is determined to be uncovered by failure to detect foldable electronic device cover 20 by sensor 18c and first display region 16a and second display region 16b are determined to be covered by sensors 18a-18b detecting foldable electronic device cover 20. In one or more embodiments, first display region 16a and second display region 16b remain or are placed in an inactive or reduced power consumption state while they are covered by portions of foldable electronic device cover 20.

Figure 5:
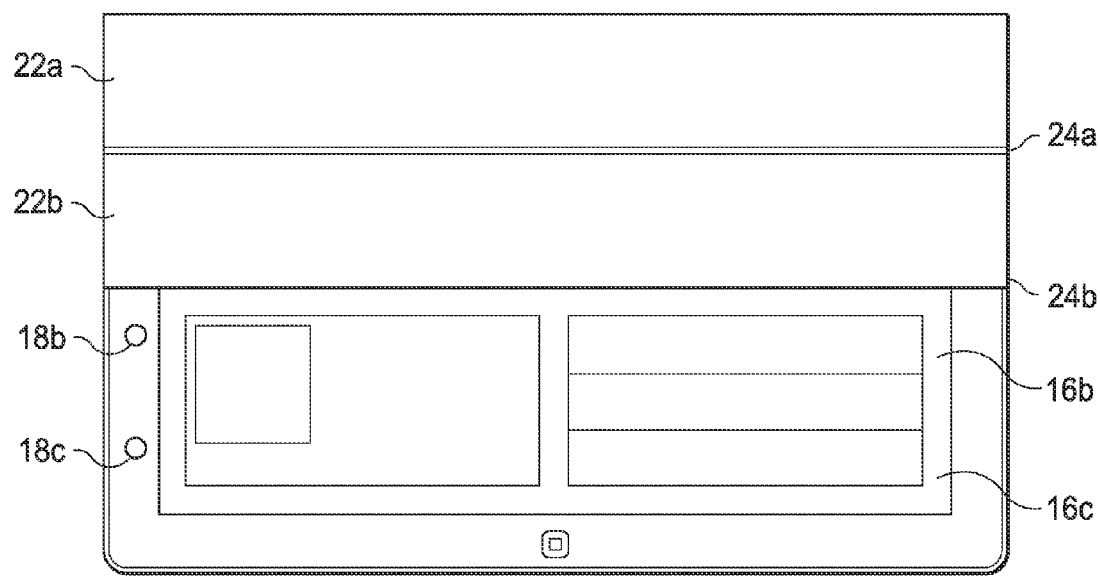
FIG. 5 illustrates another example operation of electronic device according to another embodiment.

FIG. 5 illustrates another example operation of electronic device 10 according to another embodiment. In the embodiment illustrated in FIG. 5, first foldable surface 22a and second foldable surface 22b of foldable electronic device cover 20 are covering first display region 16a of display portion 12. Second display region 16b and third display region 16c of display portion are uncovered and are configured to display second predetermined content within third display region 16c. In a particular embodiment, third foldable surface 22c has been folded along folding axis 24b and fourth foldable surface 22d has been folded along folding axis 24c to uncover second display region 16b and third display region 16c, respectively. In the embodiment illustrated in FIG. 4, the second predetermined content displayed in second display region 16b and third display region 16c includes a multimedia content player and an indication of remaining system storage. In still other embodiments, a user may configure electronic device 10 to display other predetermined content within second display region 16b and third display region 16c when second display region 16b and third display region 16c are determined to be uncovered by failure to detect foldable electronic device cover 20 by sensor 16b and sensor 18c and first display region 16a is determined to be covered by sensor 18 detecting foldable electronic device cover 20. In one or more embodiments, first display region 16a remains or is placed in an inactive or reduced power consumption state while it is covered by portions of foldable electronic device cover 20.

Figure 6:
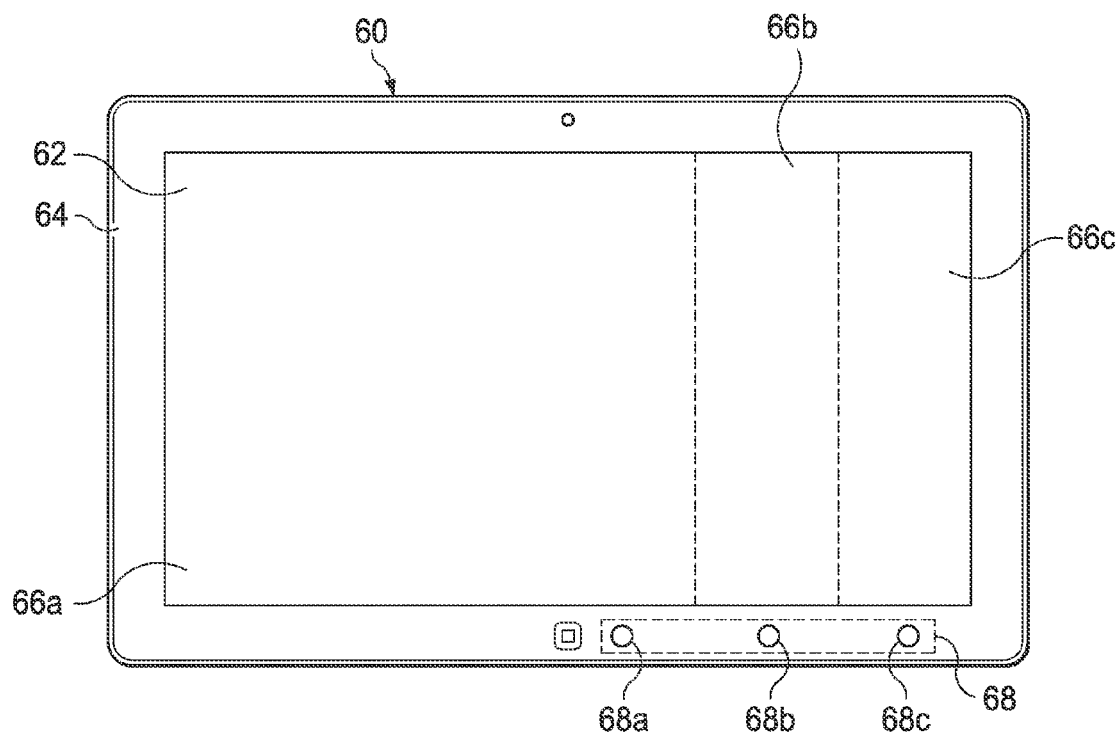
FIG. 6 is a simplified front view illustrating an electronic device in accordance with another embodiment of the present disclosure.

FIG. 6 is a simplified front view illustrating an electronic device 60 in accordance with another embodiment of the present disclosure. Electronic device 60 may include a display portion 62 and a bezel portion 64 extending around at least a portion of display portion 62. Display portion 62 may be horizontally partitioned into one or more display regions 66a-66c. In the particular embodiment illustrated in FIG. 6, a left portion of display portion 62 includes a first display region 66a sized to be approximately one-half of the size of display portion 62. Display portion 62 further includes a second display region 66b to the right of first display region 66a and sized to be approximately one-quarter of the size of display portion 62, and a third display region 66c to the right of second display region 66b and sized to be approximately one-quarter of the size of display portion 62. In particular embodiments, electronic device 60 may be configured to independently control a power state of each of first display region 66a, second display region 66b, and third display region 66c as will be further described herein. For example, electronic device 60 may be configured to control each of display region 66a, second display region 66b, and third display region 66c to be placed in an active state or one or more power saving states.

Electronic device 60 may further include a second sensor array 68 disposed horizontally along a portion of bezel portion 64. Second sensor array 68 includes one or more sensors 68a-68c configured to detect placement of at least a portion of an electronic device cover over one or more of display regions 66a-66c of electronic device 60. In the particular embodiment illustrated in FIG. 6, second sensor array 68 includes a first sensor 68a configured to detect placement of an electronic device cover over first display region 66a, a second sensor 68b configured to detect placement of an electronic device cover over second display region 66b, and a third sensor 66c configured to detect placement of an electronic device cover over third region 66c. In particular embodiments, first sensor 68a, second sensor 68b, and third sensor 68c may include one or more of a magnetic sensor, light sensor, conductor or any other sensor/device suitable for detecting proximity of a portion of an electronic device cover.

In one or more embodiments, electronic device 60 is a tablet computer and/or table device. In still other embodiments, electronic device 60 may be any suitable electronic device having a display such as a mobile device, a personal digital assistant (PDA), a smartphone, an audio system, a movie player of any type, a notebook computer or laptop computer, etc. In various embodiments, display portion 62 can be a liquid crystal display (LCD), organic light-emitting diode (OLED), or some other type of display. In particular embodiments, display portion 62 may also be a touchscreen display. In at least one embodiment, electronic device 60 may contain a camera, a microphone, speakers, one or more buttons or any other input/output device.

In one or more embodiments, electronic device 60 may be configured to trigger the display of predetermined content within one or more of display regions 66a-66c when the particular display region 66a-66c is determined by second sensor array 68 to not be covered by foldable electronic device cover 20. In various embodiments, one or more of display regions 16a-16c which are covered by an electronic device cover are placed in a reduced/lower power state such as dimmed or inactive.

Figure 7:
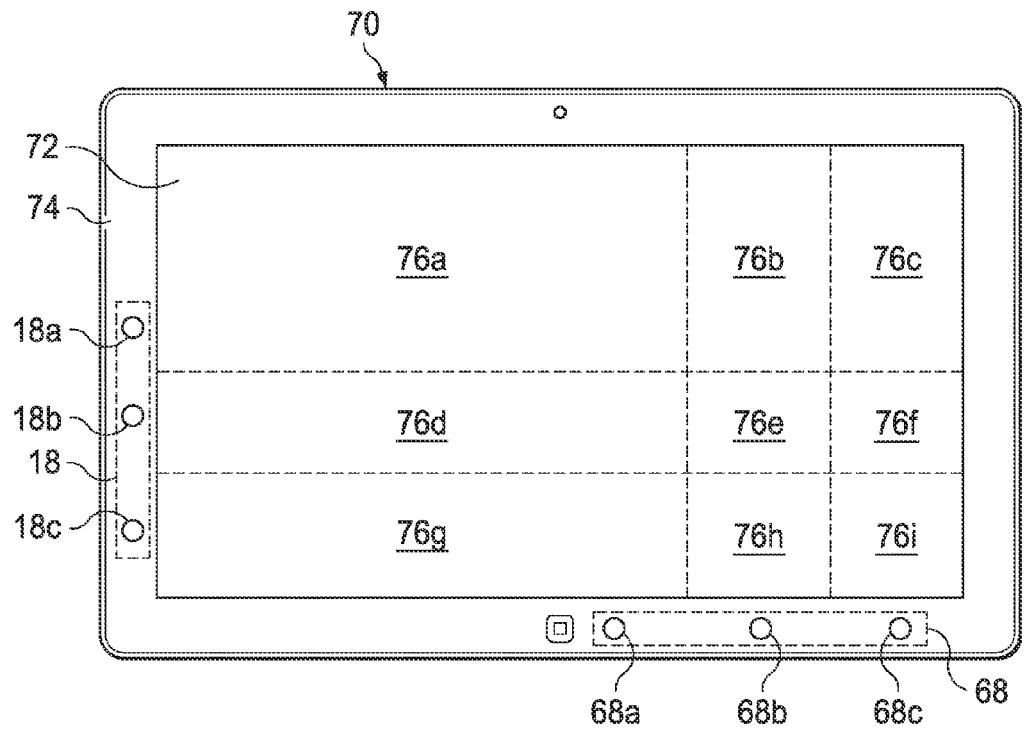
FIG. 7 is a simplified front view illustrating an electronic device in accordance with another embodiment of the present disclosure.

FIG. 7 is a simplified front view illustrating an electronic device 70 in accordance with another embodiment of the present disclosure. Electronic device 70 may include a display portion 72 and a bezel portion 74 extending around at least a portion of display portion 72. Display portion 72 may be horizontally and vertically partitioned into one or more display regions 76a-76i. In particular embodiments, electronic device 70 may be configured to independently control a power state of each of display regions 76a-76i as will be further described herein. For example, electronic device 70 may be configured to control each of display regions 76a-76i to be placed in an active state or one or more power saving states.

Electronic device 70 may further include a first sensor array 18 disposed vertically along a portion of bezel portion 74 and a second sensor array 68 disposed horizontally along a portion of bezel portion 74. First sensor array 18 includes one or more sensors 18a-18c and second sensor array 68 includes one or more sensors 68a-68c configured to detect placement of at least a portion of an electronic device cover over one or more of display regions 76a-76i of electronic device 70. In the particular embodiment illustrated in FIG. 7, first sensor array 18 includes a first sensor 18a configure to detect placement of an electronic device cover over one or more of display regions 76a-76c, a second sensor 18b configured to detect placement of an electronic device cover over one or more of display regions 76d-76f, and a third sensor 18c configured to detect placement of the electronic device cover over one or more of display regions 76g-76i. Second sensor array 68 includes a fourth sensor 68a configured to detect placement of an electronic device cover over one or more of display regions 76a, 87d, 76g, a fifth sensor 68b configured to detect placement of an electronic device cover over one or more of display regions 76b, 76e, 76h, and a sixth sensor 68c configured to detect placement of an electronic device cover over one or more of display regions 76c, 76f, 76i. In a particular embodiment, the electronic device cover may be a foldable electronic device cover having folding surface configured to be foldable along one or more horizontal and/or vertical axes.

In one or more embodiments, electronic device 70 is a tablet computer and/or table device. In still other embodiments, electronic device 70 may be any suitable electronic device having a display such as a mobile device, a personal digital assistant (PDA), a smartphone, an audio system, a movie player of any type, a notebook computer or laptop computer, etc. In various embodiments, display portion 72 can be a liquid crystal display (LCD), organic light-emitting diode (OLED), or some other type of display. In particular embodiments, display portion 62 may also be a touchscreen display. In at least one embodiment, electronic device 70 may contain a camera, a microphone, speakers, one or more buttons or any other input/output device.

In one or more embodiments, electronic device 70 may be configured to trigger the display of predetermined content within one or more of display regions 76a-76i when the particular display region 76a-76i is determined by first sensor array 18 and/or second sensor array 68 to not be covered by an electronic device cover. In various embodiments, one or more of display regions 16a-16c which are covered by an electronic device cover are placed in a reduced/lower power state such as dimmed or inactive.

Figure 8:
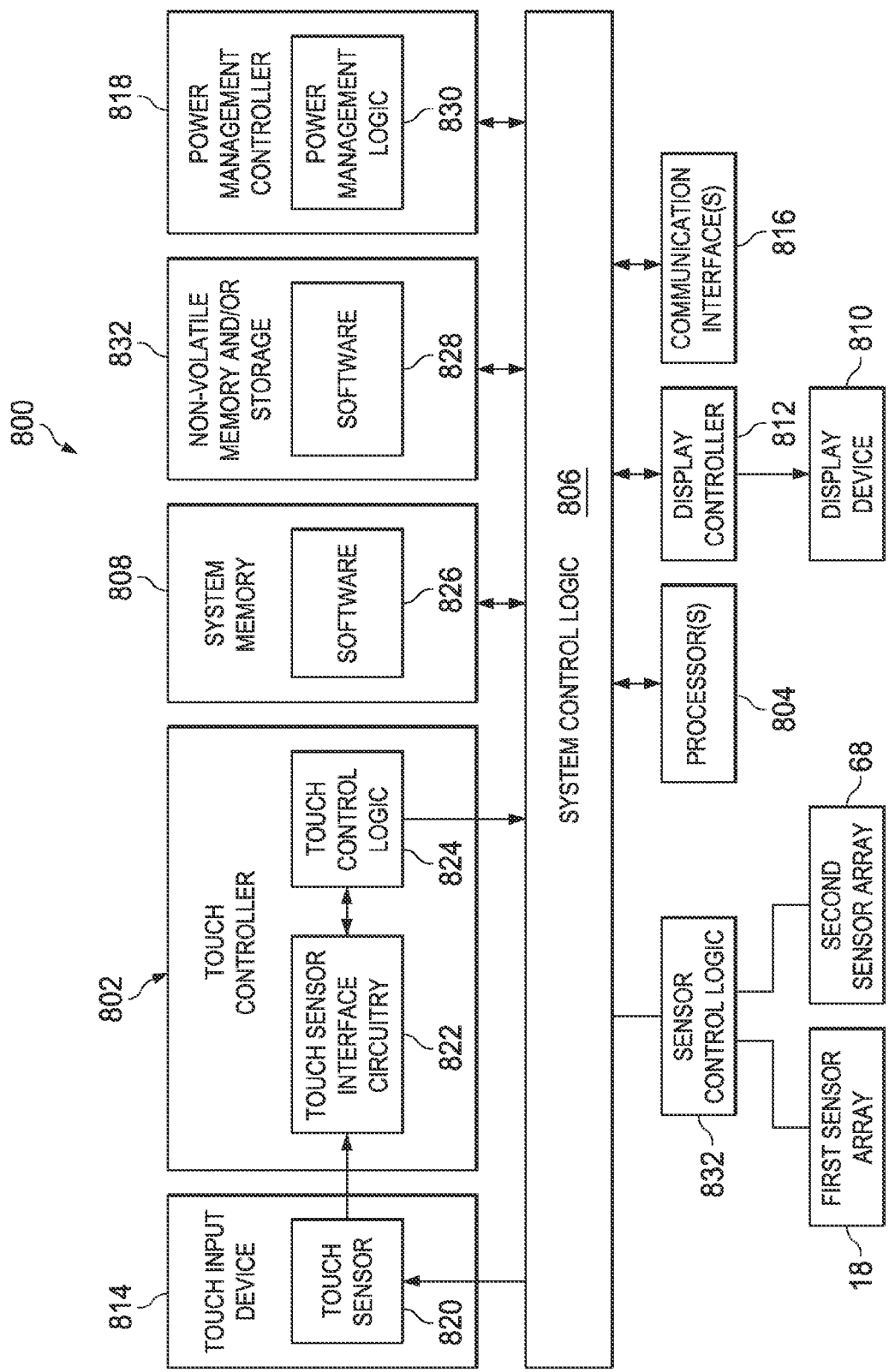
FIG. 8 is a simplified block diagram illustrating potential electronics and logic that may be associated with one or more of the electronic devices discussed herein.

FIG. 8 is a simplified block diagram illustrating potential electronics and logic 800 that may be associated with one or more of electronic device 10, 60, or 70 discussed herein. In at least one example embodiment, system 800 can include a touch controller 802, one or more processors 804, system control logic 806 coupled to at least one of processor(s) 804, system memory 808 coupled to system control logic 806, non-volatile memory and/or storage device(s) 832 coupled to system control logic 806, display controller 812 coupled to system control logic 806, display controller 812 coupled to a display device 810, power management controller 818 coupled to system control logic 806, communication interfaces 816, and/or sensor control logic 832 coupled to system control logic 806. Sensor control logic 832 is further coupled to one or more of first sensor array 18 and second sensor array 68.

Hence, the basic building blocks of any computer system (e.g., processor, memory, I/O, display, etc.) can be used in conjunction with the teachings of the present disclosure. Certain components could be discrete or integrated into a System on Chip (SoC). Some general system implementations can include certain types of form factors in which system 800 is part of a more generalized enclosure. In alternate implementations, instead of notebook device/laptops, etc., certain alternate embodiments deal with mobile phones, tablet devices, etc.

System control logic 806, in at least one embodiment, can include any suitable interface controllers to provide for any suitable interface to at least one processor 804 and/or to any suitable device or component in communication with system control logic 806. System control logic 806, in at least one embodiment, can include one or more memory controllers to provide an interface to system memory 808. System memory 808 may be used to load and store data and/or instructions, for example, for system 800. System memory 808, in at least one embodiment, can include any suitable volatile memory, such as suitable dynamic random access memory (DRAM) for example. System control logic 806, in at least one embodiment, can include one or more I/O controllers to provide an interface to display device 810, touch controller 802, and non-volatile memory and/or storage device(s) 832. In particular embodiments, display device 810 may include one or more of display portions 12, 62 and 72.

Non-volatile memory and/or storage device(s) 832 may be used to store data and/or instructions, for example within software 828. Non-volatile memory and/or storage device(s) 832 may include any suitable non-volatile memory, such as flash memory for example, and/or may include any suitable non-volatile storage device(s), such as one or more hard disc drives (HDDs), one or more compact disc (CD) drives, and/or one or more digital versatile disc (DVD) drives for example.

Power management controller 818 may include power management logic 830 configured to control various power management and/or power saving functions. In at least one example embodiment, power management controller 818 is configured to reduce the power consumption of components or devices of system 800 that may either be operated at reduced power or turned off when the electronic device is in a closed configuration. For example, in at least one embodiment, when the electronic device is in a closed configuration, power management controller 818 performs one or more of the following: power down the unused portion of the display and/or any backlight associated therewith and allow one or more of processor(s) 804 to go to a lower power state if less computing power is required.

Communications interface(s) 816 may provide an interface for system 800 to communicate over one or more networks and/or with any other suitable device. Communications interface(s) 816 may include any suitable hardware and/or firmware. Communications interface(s) 816, in at least one example embodiment, may include, for example, a network adapter, a wireless network adapter, a telephone modem, and/or a wireless modem. System control logic 806, in at least one embodiment, can include one or more I/O controllers to provide an interface to any suitable input/output device(s) such as, for example, an audio device to help convert sound into corresponding digital signals and/or to help convert digital signals into corresponding sound, a camera, a camcorder, a printer, and/or a scanner.

For at least one embodiment, at least one processor 804 may be packaged together with logic for one or more controllers of system control logic 806. In at least one embodiment, at least one processor 804 may be packaged together with logic for one or more controllers of system control logic 806 to form a System in Package (SiP). In at least one embodiment, at least one processor 804 may be integrated on the same die with logic for one or more controllers of system control logic 806. For at least one embodiment, at least one processor 804 may be integrated on the same die with logic for one or more controllers of system control logic 806 to form a System on Chip (SoC).

For touch control, touch controller 802 may include touch sensor interface circuitry 822 and touch control logic 824. Touch sensor interface circuitry 822 may be coupled to detect touch input over a first touch surface layer and a second touch surface layer of a display (i.e., display device 810). Touch sensor interface circuitry 822 may include any suitable circuitry that may depend, for example, at least in part on the touch-sensitive technology used for a touch input device. Touch sensor interface circuitry 822, in one embodiment, may support any suitable multi-touch technology. Touch sensor interface circuitry 822, in at least one embodiment, can include any suitable circuitry to convert analog signals corresponding to a first touch surface layer and a second surface layer into any suitable digital touch input data. Suitable digital touch input data for at least one embodiment may include, for example, touch location or coordinate data.

Touch control logic 824 may be coupled to help control touch sensor interface circuitry 822 in any suitable manner to detect touch input over a first touch surface layer and a second touch surface layer. Touch control logic 824 for at least one example embodiment may also be coupled to output in any suitable manner digital touch input data corresponding to touch input detected by touch sensor interface circuitry 822. Touch control logic 824 may be implemented using any suitable logic, including any suitable hardware, firmware, and/or software logic (e.g., non-transitory tangible media), that may depend, for example, at least in part on the circuitry used for touch sensor interface circuitry 822. Touch control logic 824 for at least one embodiment may support any suitable multi-touch technology.

Touch control logic 824 may be coupled to output digital touch input data to system control logic 806 and/or at least one processor 804 for processing. At least one processor 804 for at least one embodiment may execute any suitable software to process digital touch input data output from touch control logic 824. Suitable software may include, for example, any suitable driver software and/or any suitable application software. As illustrated in FIG. 8, system memory 808 may store suitable software 826 and/or non-volatile memory and/or storage device(s).

Sensor control logic 832 may be configured to receive sensor signals from respective sensors of one or more of first sensor array 18 and second sensor array 68. Processor(s) 804 may be configured to receive the sensor signals and determine whether one or more display regions of a particular display portion 12, 62 or 72 is either uncovered or covered by a portion of an electronic device cover based upon the received sensor signals. Processor(s) 804 and may cause predetermined content to be displayed in one or more display regions of the particular display portion 12, 62, or 72 determined to be uncovered as described herein. Processor(s) 804 may be further configured to cause one or more display regions of the particular display portion 12, 62, or 72 determined to be covered to enter a lower power and/or inactive state as described herein.

Figure 9:
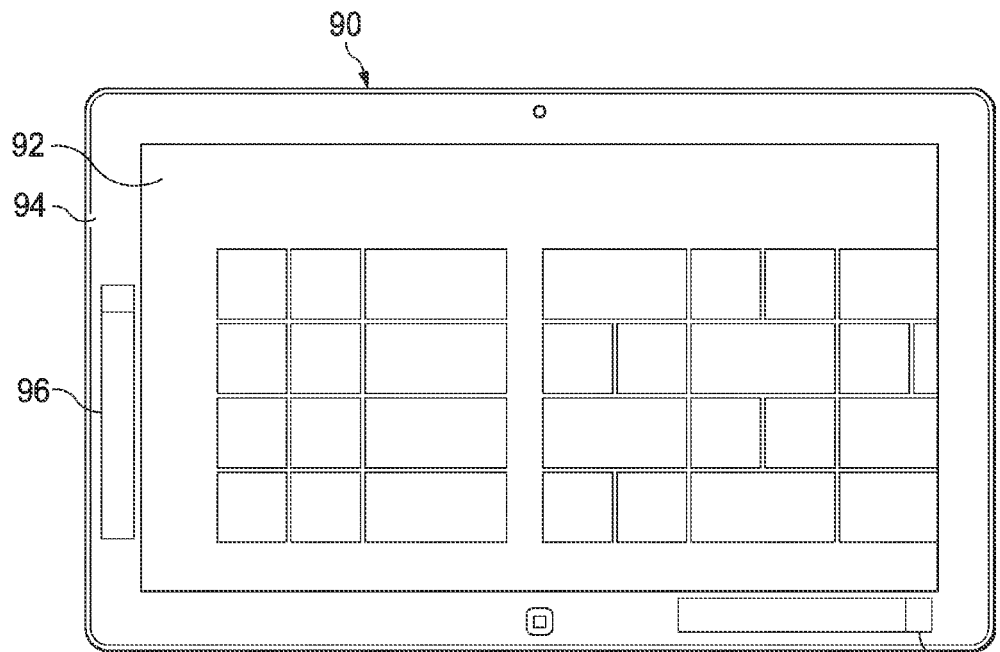
FIG. 9 is a simplified front view illustrating an embodiment of an electronic device in accordance with one embodiment of the present disclosure.

FIG. 9 is a simplified front view illustrating an embodiment of an electronic device 90 in accordance with one embodiment of the present disclosure. Electronic device 90 may include a display portion 92 and a bezel portion 14 extending around at least a portion of display portion 92. Display portion 92 may be configured to be horizontally and/or vertically partitioned into one or more display regions. Electronic device 90 may further include a first scroll bar 96 disposed vertically along a portion of bezel portion 94, and a second scroll bar 98 disposed horizontally along a portion of bezel portion 94. In a particular embodiment, first scroll bar 96 and second scroll bar 98 may include touch surfaces providing software scroll bars responsive to a touch from a user. In another particular embodiment, first scroll bar 96 and second scroll bar 98 may include one or more hardware scroll devices such as physical sliders or other suitable components.

In accordance with various embodiments, electronic device 90 may be configured to independently control a power state of each of the partitioned display regions in response to the positions of the first scroll bar 96 and the second scroll bar 98 as will be further described herein. For example, electronic device 90 may be configured to control each of the display regions of display portion to be placed in an active state or one or more power saving states depending upon the positions of first scroll bar 96 and second scroll bar 98. In other embodiments, first scroll bar 96 and second scroll bar 98 may be placed on other portions of electronic device 90 instead of bezel portion 94 such as a back surface or edges of electronic device 90. In some embodiments, first scroll bar 96 and second scroll bar 98 may be configured to enable a user to dynamically turn off a region of display portion 92 to conserve power and/or provide an enhanced user experience by allowing the user to pre-set a type of content such as predetermined graphical elements and/or information to be displayed in a particular predefined state.

In one or more embodiments, electronic device 90 is a tablet computer and/or table device. In still other embodiments, electronic device 90 may be any suitable electronic device having a display such as a mobile device, a personal digital assistant (PDA), a smartphone, an audio system, a movie player of any type, a notebook computer or laptop computer, etc. In various embodiments, display portion 92 can be a liquid crystal display (LCD), organic light-emitting diode (OLED), or some other type of display. In particular embodiments, display portion 92 may also be a touchscreen display. In at least one embodiment, electronic device 90 may contain a camera, a microphone, speakers, one or more buttons or any other input/output device.

Figure 10:
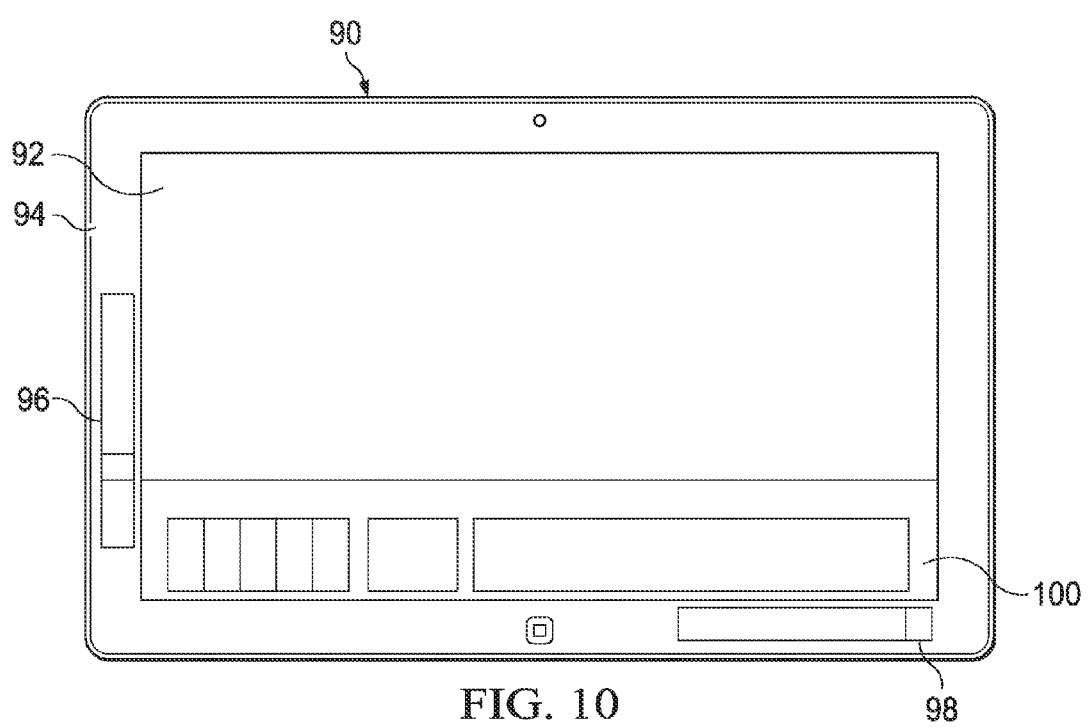
FIG. 10 illustrates an example operation of the electronic device of FIG. 9 according to one embodiment.

FIG. 10 illustrates an example operation of electronic device 90 according to one embodiment. In the embodiment illustrated in FIG. 10, first scroll bar 96 is set to display twenty-five percent (25%) of the vertical extent of display portion 92 and second scroll bar 98 is set to display one hundred percent (100%) of the horizontal extent of display portion 92. Responsive to the positions of first scroll bar 96 and second scroll bar 98, electronic device 90 is configured to display first predetermined content 100 within the lower 25% of the vertical extent of display portion 92 and within 100% of the horizontal extent of display portion 92. Electronic device 90 may be further configured to place the remaining regions of display portion into a reduced power consumption state.

In the embodiment illustrated in FIG. 10, first predetermined content 100 includes a weekly weather forecast, a received e-mail indication, and a current date. In still other embodiments, a user may configure electronic device 90 to display other predetermined content within one or more regions of display portion 92 in response to the positions of first scroll bar 96 and second scroll bar 98.

Figure 11:
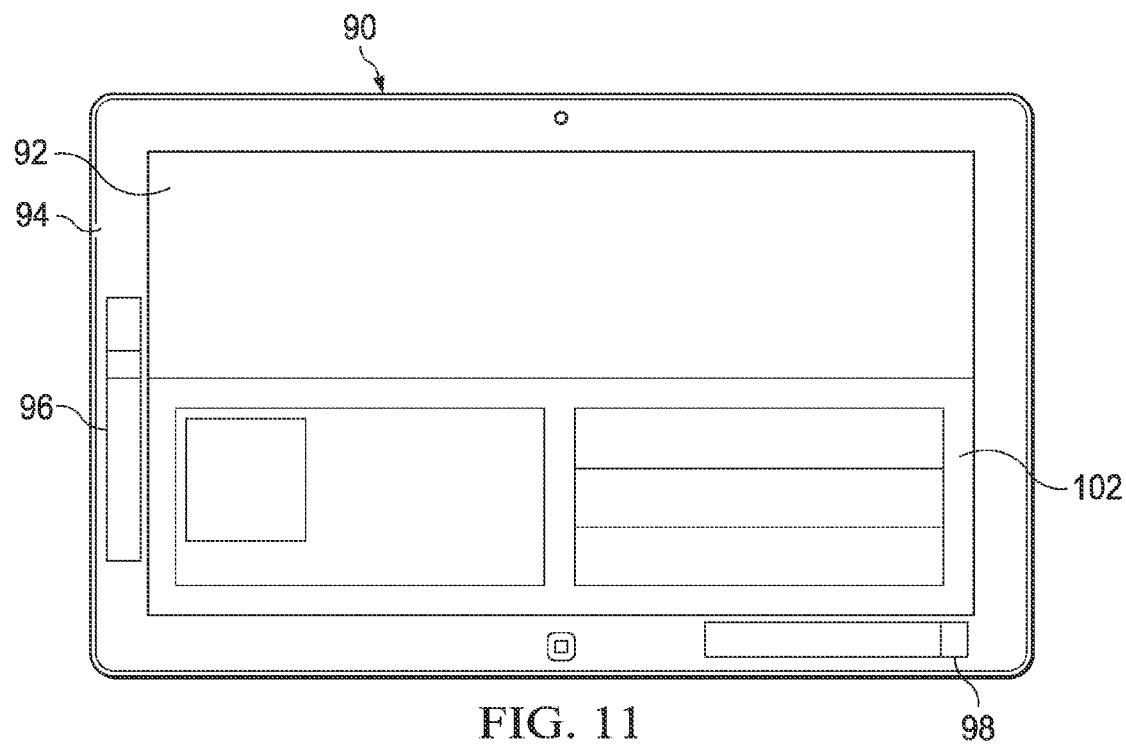
FIG. 11 illustrates another example operation of the electronic device of FIG. 9 according to another embodiment.

FIG. 11 illustrates another example operation of electronic device 90 according to another embodiment. In the embodiment illustrated in FIG. 11, first scroll bar 96 is set to fifty percent (50%) of the vertical extent of display portion 92 and second scroll bar 98 is set to display one hundred percent (100%) of the horizontal extent of display portion 92. Responsive to the positions of first scroll bar 96 and second scroll bar 98, electronic device 90 is configured to display second predetermined content 102 within the lower 50% of the vertical extent of display portion 92 and within 100% of the horizontal extent of display portion 92. Electronic device 90 may be further configured to place the remaining regions of display portion into a reduced power consumption state.

In the embodiment illustrated in FIG. 11, second predetermined content 102 includes a multimedia content player and an indication of remaining system storage. In still other embodiments, a user may configure electronic device 90 to display other predetermined content within one or more regions of display portion 92 in response to the positions of first scroll bar 96 and second scroll bar 98.

Figure 12:
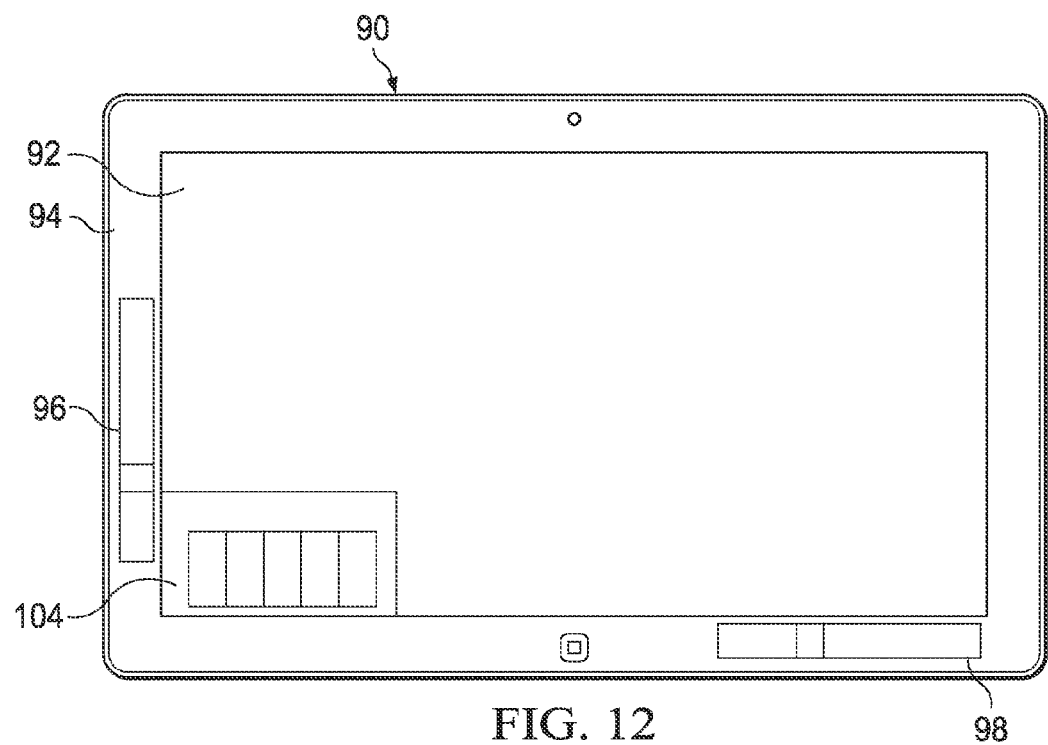
FIG. 12 illustrates another example operation of the electronic device of FIG. 9 according to another embodiment.

FIG. 12 illustrates another example operation of electronic device 90 according to another embodiment. In the embodiment illustrated in FIG. 12, first scroll bar 96 is set to twenty-five percent (25%) of the vertical extent of the lower portion of display portion 92 and second scroll bar 98 is set to display twenty-five percent (25%) of the horizontal extent of the left portion of display portion 92. Responsive to the positions of first scroll bar 96 and second scroll bar 98, electronic device 90 is configured to display third predetermined content 102 within the lower 25% of the vertical extent of display portion 92 and within the leftmost 25% of the horizontal extent of display portion 92. Electronic device 90 may be further configured to place the remaining regions of display portion into a reduced power consumption state.

In the embodiment illustrated in FIG. 12, third predetermined content 104 includes a weather forecast. In still other embodiments, a user may configure electronic device 90 to display other predetermined content within one or more regions of display portion 92 in response to the positions of first scroll bar 96 and second scroll bar 98.

Figure 13:
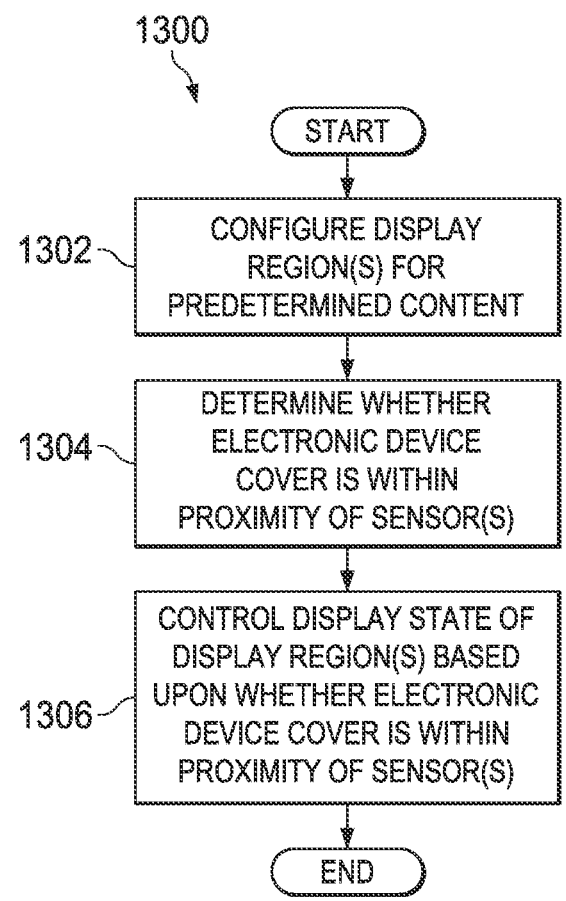
FIG. 13 is a simplified flow diagram illustrating potential operations for an electronic device in accordance with one embodiment of the present disclosure.

FIG. 13 is a simplified flow diagram 1300 illustrating potential operations for an electronic device 10, 20, 60, 70 in accordance with one embodiment of the present disclosure. In 1302, a user may configure one or more display regions(s) partitioned from a display portion of electronic device 10, 20, 60, 70 for predetermined content. In particular embodiments, the user may configure the type of content which may be displayed by each of the particular display regions of the display portion when the particular display region is determined to be uncovered. In 1304, electronic device 10, 20, 60, 70 determines whether a portion of an electronic device cover is within proximity of at least one sensor of a plurality of sensors in which each of the plurality of sensors is associated with a particular display region of the plurality of display regions.

In 1306, electronic device 10, 20, 60, 70 controls a display state of one or more of the particular display region associated with the at least one sensor based upon whether the portion of the electronic device cover is determined to be within proximity of the sensor. In particular embodiments, controlling the display state of the particular display region further includes displaying the predetermined content within the display region when the portion of the electronic device cover is determined to not be within proximity of the sensor associated with the particular display region. In still other embodiments, controlling the display state of the particular display region further includes placing the display region in an active state when the portion of the electronic device cover is determined to be within proximity of the sensor associated with the display region. In still other embodiments, controlling the display state of the particular display region further includes placing the display region in a power saving state when the portion of the electronic device cover is determined to be within proximity of the sensor associated with the display region.

Note that in some example implementations, the functions outlined herein may be implemented in conjunction with logic that is encoded in one or more tangible, non-transitory media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements can store data used for the operations described herein. This can include the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), electrically erasable programmable read-only memory (EEPROM)) or an ASIC that can include digital logic, software, code, electronic instructions, or any suitable combination thereof. In one or more embodiments, the logic may be at least partially implemented in hardware and may include, for example, a processor running application code, an ASIC, a processor running firmware, hardware circuitry integrated into or discrete from a system on chip (SoC), etc.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include one or more non-transitory, tangible, machine readable media having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "non-transitory machine readable medium" shall accordingly include, but not be limited to, memories* such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

It is imperative to note that all of the specifications, dimensions, and relationships outlined herein (e.g., height, width, length, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Example Embodiment Implementations

The following examples pertain to embodiments in accordance with this Specification. Note that all optional features of the apparatuses and systems described above may also be implemented with respect to the method or process described herein and specifics in the examples may be used anywhere in one or more embodiments.

Example 1 is an apparatus, comprising logic, at least partially implemented in hardware, to determine a display state of a first partitioned region of a display, based at least in part on a proximity of a display cover to the first partitioned region.

In Example 2, the subject matter of Example 1 can optionally include wherein the logic is configured to determine a display state of a second partitioned region of the display separately from the first partitioned region.

In Example 3, the subject matter of Examples 1-2 can optionally include wherein determining the display state of the first partitioned region includes displaying predetermined content within the first partitioned region when the display cover is determined to not be within proximity of the first partitioned region.

In Example 4, the subject matter of Example 3 can optionally include wherein the logic is configured to allow a user to configure the predetermined content.

In Example 5, the subject matter of Examples 1-2 can optionally include wherein determining the display state of the first partitioned region includes placing the first partitioned region in an active state when the display cover is determined to be within proximity of the first partitioned region.

In Example 6, the subject matter of Examples 1-2 can optionally include wherein determining the display state of the first partitioned region includes placing the first partitioned region in a power saving state when the display cover is determined to be within proximity of the first partitioned region.

In Example 7, the subject matter of Examples 1-6 can optionally include wherein the display cover includes a plurality of foldable surfaces.

In Example 8, the subject matter of Examples 1-27 can optionally include a plurality of sensors, each of the plurality of sensors being associated with a particular partitioned region of the display and configured to determine whether a portion of the display cover is within proximity to the sensor; and wherein the logic is configured to determine the display state of the particular partitioned region associated with the sensor based upon whether the portion of the display cover is determined to be within proximity of the sensor.

In Example 9, the subject matter of Example 8 can optionally include wherein the plurality of sensors includes a first array of sensors disposed vertically along a portion of the display.

In Example 10, the subject matter of Example 8 can optionally include wherein the plurality of sensors includes a second array of sensors disposed horizontally along a portion of the display.

In Example 11, the subject matter of Examples 8 can optionally include wherein the plurality of sensors includes a first array of sensors disposed vertically along a portion of the display, and a second array of sensors disposed horizontally along a portion of the display.

Example 12 is a system comprising: a display portion of an electronic device, the display portion being partitioned into a plurality of display regions; a plurality of sensors, each of the plurality of sensors being associated with a particular display region of the plurality of display regions and configured to determine whether a portion of an electronic device cover is within proximity to the sensor; and logic to determine a display state of the particular display region associated with the sensor based upon whether the portion of the electronic device cover is determined to be within proximity of the sensor.

In Example 13, the subject matter of Example 12 can optionally include wherein determining the display state of the particular display region includes displaying predetermined content within the display region when the portion of the electronic device cover is determined to not be within proximity of the sensor associated with the particular display region.

In Example 14, the subject matter of Example 13 can optionally include wherein the electronic device is configured to allow a user to configure the predetermined content.

In Example 15, the subject matter of Example 12 can optionally include wherein determining the display state of the particular display region includes placing the display region in an active state when the portion of the electronic device cover is determined to be within proximity of the sensor associated with the display region.

In Example 16, the subject matter of Example 12 can optionally include wherein determining the display state of the particular display region includes placing the display region in a power saving state when the portion of the electronic device cover is determined to be within proximity of the sensor associated with the display region.

In Example 17, the subject matter of Examples 12-16 can optionally include wherein the electronic device cover includes a plurality of foldable surfaces.

In Example 18, the subject matter of Examples 12-17 can optionally include wherein the plurality of sensors includes a first array of sensors disposed vertically along a bezel portion of the electronic device.

In Example 19, the subject matter of Examples 12-17 can optionally include wherein the plurality of sensors includes a second array of sensors disposed horizontally along a bezel portion of the electronic device.

In Example 20, the subject matter of Examples 12-17 can optionally include wherein the plurality of sensors includes a first array of sensors disposed vertically along a bezel portion of the electronic device, and a second array of sensors disposed horizontally along a bezel portion of the electronic device.

Example 21 is at least one computer readable storage medium comprising instructions, wherein the instructions when executed by at least one processor cause the at least one processor to: determine a display state of a first partitioned region of a display, based at least in part on a proximity of a display cover to the first partitioned region.

In Example 22, the subject matter of Example 21 can optionally include wherein the instructions further cause the at least one processor to determine a display state of a second partitioned region of the display separately from the first partitioned region.

In Example 23, the subject matter of Example 21 can optionally include wherein determining the display state of the first partitioned region includes displaying predetermined content within the first partitioned region when the display cover is determined to not be within proximity of the first partitioned region.

In Example 24, the subject matter of Example 23 can optionally include wherein the logic is configured to allow a user to configure the predetermined content.

In Example 25, the subject matter of Example 21 can optionally include wherein determining the display state of the first partitioned region includes placing the first partitioned region in an active state when the display cover is determined to be within proximity of the first partitioned region.

In Example 26, the subject matter of Example 21 can optionally include wherein determining the display state of the first partitioned region includes placing the first partitioned region in a power saving state when the display cover is determined to be within proximity of the first partitioned region.

Example 27 is a method comprising determining a display state of a first partitioned region of a display, based at least in part on a proximity of a display cover to the first partitioned region.

In Example 28, the subject matter of Example 27 can optionally include determining a display state of a second partitioned region of the display separately from the first partitioned region.

In Example 29, the subject matter of Examples 27-28 can optionally include determining the display state of the first partitioned region includes displaying predetermined content within the first partitioned region when the display cover is determined to not be within proximity of the first partitioned region.

In Example 30, the subject matter of Example 29 can optionally include wherein the logic is configured to allow a user to configure the predetermined content.

In Example 31, the subject matter of Example 27 can optionally include wherein determining the display state of the first partitioned region includes placing the first partitioned region in an active state when the display cover is determined to be within proximity of the first partitioned region.

In Example 32, the subject matter of Examples 27-28 can optionally include wherein determining the display state of the first partitioned region includes placing the first partitioned region in a power saving state when the display cover is determined to be within proximity of the first partitioned region.

In Example 33, the subject matter of Examples 27-32 can optionally include wherein the display cover includes a plurality of foldable surfaces.

Example 34 is an apparatus comprising means for performing the method of any one of Examples 27-33.

In Example 35, the subject matter of Example 34 can optionally include wherein the means for performing the method comprise a processor and a memory.

In Example 36, the subject matter of Example 35 can optionally include wherein the memory comprises machine readable instructions, that when executed cause the apparatus to perform the method of any one of Examples 27-33.

In Example 37, the subject matter of any one of Examples 27-36 can optionally include wherein the apparatus is a computing system.

Example 38 is at least one computer readable medium comprising instructions that, when executed, implement a method or realize an apparatus as described in any one of Examples 1-11 or 27-33.

Example 39 is an apparatus comprising means for determining a display state of a first partitioned region of a display, based at least in part on a proximity of a display cover to the first partitioned region.

In Example 40, the subject matter of Example 39 can optionally include means for determining a display state of a second partitioned region of the display separately from the first partitioned region.

In Example 41, the subject matter of Examples 39-40 can optionally include wherein determining the display state of the first partitioned region includes displaying predetermined content within the first partitioned region when the display cover is determined to not be within proximity of the first partitioned region.

In Example 42, the subject matter of Example 41 can optionally include means for allowing a user to configure the predetermined content.

In Example 43, the subject matter of Examples 39-40 can optionally include wherein determining the display state of the first partitioned region includes placing the first partitioned region in an active state when the display cover is determined to be within proximity of the first partitioned region.

In Example 44, the subject matter of Examples 39-40 can optionally include wherein determining the display state of the first partitioned region includes placing the first partitioned region in a power saving state when the display cover is determined to be within proximity of the first partitioned region.

In Example 45, the subject matter of Examples 39-44 can optionally include wherein the display cover includes a plurality of foldable surfaces.

In Example 46, the subject matter of Examples 39-45 can optionally include a plurality of sensors, each of the plurality of sensors being associated with a particular partitioned region of the display and configured to determine whether a portion of the display cover is within proximity to the sensor; and means for determining the display state of the particular partitioned region associated with the sensor based upon whether the portion of the display cover is determined to be within proximity of the sensor.

In Example 47, the subject matter of Example 46 can optionally include wherein the plurality of sensors includes a first array of sensors disposed vertically along a portion of the display.

In Example 48, the subject matter of Examples 46-47 can optionally include wherein the plurality of sensors includes a second array of sensors disposed horizontally along a portion of the display.

What is claimed is:

1. An apparatus, comprising:
   logic, at least partially implemented in hardware, to determine a display state of a first partitioned region of a display, based at least in part on a proximity of a display cover to the first partitioned region;
   a first array of sensors disposed vertically along a plurality of vertically partitioned regions of the display and having at least one vertical sensor associated with each vertically partitioned region and configured to determine whether a portion of the display cover is within proximity to the at least one vertical sensor; and
   a second array of sensors disposed horizontally along a plurality of horizontally partitioned regions of the display and having at least one horizontal sensor associated with each horizontally partitioned region and configured to determine whether a portion of the display cover is within proximity to the at least one horizontal sensor; and
   wherein the logic is configured to determine the display state of a particular partitioned region defined by at least one of the vertically partitioned regions and at least one of the horizontally partitioned regions based upon whether the portion of the display cover is determined to be within proximity of one or more of the at least one vertical sensor and the at least one horizontal sensor associated with the particular partitioned region.

2. The apparatus of claim 1, wherein the logic is configured to determine a display state of a second partitioned region of the display separately from the first partitioned region.

3. The apparatus of claim 1, wherein determining the display state of the first partitioned region includes displaying predetermined content within the first partitioned region when the display cover is determined to not be within proximity of the first partitioned region.

4. The apparatus of claim 3, wherein the logic is configured to allow a user to configure the predetermined content.

5. The apparatus of claim 1, wherein determining the display state of the first partitioned region includes placing the first partitioned region in an active state when the display cover is determined to be within proximity of the first partitioned region.

6. The apparatus of claim 1, wherein determining the display state of the first partitioned region includes placing the first partitioned region in a power saving state when the display cover is determined to be within proximity of the first partitioned region.

7. The apparatus of claim 1, wherein the display cover includes a plurality of foldable surfaces.

8. A system, comprising:
   a display portion of an electronic device, the display portion being partitioned into a plurality of display regions;
   a first array of sensors disposed vertically along a plurality of vertically partitioned regions of the display and having at least one vertical sensor associated with each vertically partitioned region and configured to determine whether a portion of the display cover is within proximity to the at least one vertical sensor;
   a second array of sensors disposed horizontally along a plurality of horizontally partitioned regions of the display and having at least one horizontal sensor associated with each horizontally partitioned region and configured to determine whether a portion of the display cover is within proximity to the at least one horizontal sensor; and
   logic to determine the display state of a particular partitioned region defined by at least one of the vertically partitioned regions and at least one of the horizontally partitioned regions based upon whether the portion of the display cover is determined to be within proximity of one or more of the at least one vertical sensor and the at least one horizontal sensor associated with the particular partitioned region.

9. The system of claim 8, wherein determining the display state of the particular display region includes displaying predetermined content within the display region when the portion of the electronic device cover is determined to not be within proximity of the sensor associated with the particular display region.

10. The system of claim 9, wherein the electronic device is configured to allow a user to configure the predetermined content.

11. The system of claim 8, wherein determining the display state of the particular display region includes placing the display region in an active state when the portion of the electronic device cover is determined to be within proximity of the sensor associated with the display region.

12. The system of claim 8, wherein determining the display state of the particular display region includes placing the display region in a power saving state when the portion of the electronic device cover is determined to be within proximity of the sensor associated with the display region.

13. The system of claim 8, wherein the electronic device cover includes a plurality of foldable surfaces.

14. The system of claim 8, wherein the first array of sensors is disposed vertically along a bezel portion of the electronic device.

15. The system of claim 8, wherein the second array of sensors is disposed horizontally along a bezel portion of the electronic device.

16. At least one non-transitory computer readable storage medium comprising instructions, wherein the instructions when executed by at least one processor cause the at least one processor to:

determine a display state of a first partitioned region of a display of an electronic device, based at least in part on a proximity of a display cover to the first partitioned region;

wherein the electronic device includes:

a first array of sensors disposed vertically along a plurality of vertically partitioned regions of the display and having at least one vertical sensor associated with each vertically partitioned region and configured to determine whether a portion of the display cover is within proximity to the at least one vertical sensor, and a second array of sensors disposed horizontally along a plurality of horizontally partitioned regions of the display and having at least one horizontal sensor associated with each horizontally partitioned region and configured to determine whether a portion of the display cover is within proximity to the at least one horizontal sensor; and wherein the instructions further cause the at least one processor to determine the display state of a particular partitioned region defined by at least one of the vertically partitioned regions and at least one of the horizontally partitioned regions based upon whether the portion of the display cover is determined to be within proximity of one or more of the at least one vertical sensor and the at least one horizontal sensor associated with the particular partitioned region.

17. The media of claim 16, wherein the instructions further cause the at least one processor to determine a display state of a second partitioned region of the display separately from the first partitioned region.

18. The media of claim 16, wherein determining the display state of the first partitioned region includes displaying predetermined content within the first partitioned region when the display cover is determined to not be within proximity of the first partitioned region.

19. The media of claim 18, wherein the logic is configured to allow a user to configure the predetermined content.

20. The media of claim 16, wherein determining the display state of the first partitioned region includes placing the first partitioned region in an active state when the display cover is determined to be within proximity of the first partitioned region.

21. The media of claim 16, wherein determining the display state of the first partitioned region includes placing the first partitioned region in a power saving state when the display cover is determined to be within proximity of the first partitioned region.

* * * * *